(12) United States Patent
Li et al.

(10) Patent No.: US 12,527,121 B2
(45) Date of Patent: Jan. 13, 2026

(54) MICRO LIGHT EMITTING DIODES WITH NANOSTRUCTURES

(71) Applicant: The Regents of the University of California, Oakland, CA (US)

(72) Inventors: Guangru Li, La Jolla, CA (US); Zhaowei Liu, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 757 days.

(21) Appl. No.: 17/438,090

(22) PCT Filed: Mar. 13, 2020

(86) PCT No.: PCT/US2020/022617
§ 371 (c)(1),
(2) Date: Sep. 10, 2021

(87) PCT Pub. No.: WO2020/190716
PCT Pub. Date: Sep. 24, 2020

(65) Prior Publication Data
US 2022/0190197 A1 Jun. 16, 2022

Related U.S. Application Data

(60) Provisional application No. 62/818,970, filed on Mar. 15, 2019.

(51) Int. Cl.
*H10H 20/811* (2025.01)
*G06F 30/23* (2020.01)
(Continued)

(52) U.S. Cl.
CPC .......... *H10H 20/811* (2025.01); *G06F 30/23* (2020.01); *H10H 20/01* (2025.01);
(Continued)

(58) Field of Classification Search
CPC ....... H01L 33/04; H01L 33/005; H01L 33/06; H01L 33/20; H01L 33/44; G06F 30/23;
(Continued)

(56) References Cited

U.S. PATENT DOCUMENTS

| 2013/0092897 A1* | 4/2013 | Shambat ............... H01S 5/3063 257/13 |
| 2016/0087143 A1 | 3/2016 | Teo et al. |

(Continued)

OTHER PUBLICATIONS

International Search Report and Written Opinion issued in International Application No. PCT/US2020/022617, mailed Jun. 12, 2020, (Dec. 6, 2020). 8 pages.

(Continued)

*Primary Examiner* — Michael Jung
(74) *Attorney, Agent, or Firm* — FisherBroyles, LLP

(57) ABSTRACT

A light emitting diode may include a light emission layer and a charge transport layer disposed on the light emission layer. One or more nanostructures may be formed by removing a portion of the charge transport layer and/or the light emission layer and depositing a plasmonic metamaterial on a remaining portion of the charge transport layer and/or the light emission layer. The one or more nanostructures may include the plasmonic metamaterial deposited inside the recesses formed by the remaining portion of the charge transport layer and/or the light emission layer, with an additional portion of the charge transport layer disposed on top. A material composition, shape, dimension, placement, and/or distribution of the one or more nanostructures may be configured to maximize the quantum efficiency of the light emitting diode, especially at a microscale of less than 100 microns.

19 Claims, 13 Drawing Sheets

(51) Int. Cl.
*H10H 20/01* (2025.01)
*H10H 20/812* (2025.01)
*H10H 20/819* (2025.01)
*H10H 20/84* (2025.01)
*G06F 111/08* (2020.01)
*H10H 20/80* (2025.01)
*H10H 20/816* (2025.01)

(52) U.S. Cl.
CPC ........ *H10H 20/812* (2025.01); *H10H 20/819* (2025.01); *H10H 20/84* (2025.01); *G06F 2111/08* (2020.01); *H10H 20/034* (2025.01); *H10H 20/816* (2025.01); *H10H 20/882* (2025.01)

(58) Field of Classification Search
CPC ... H10H 20/811; H10H 20/812; H10H 20/819
See application file for complete search history.

(56) References Cited

U.S. PATENT DOCUMENTS

| 2016/0141836 | A1* | 5/2016 | Leobandung ........... H01L 33/24 372/45.01 |
| 2017/0133631 | A1 | 5/2017 | Thompson et al. |
| 2017/0179334 | A1 | 6/2017 | Liu et al. |
| 2018/0076353 | A1* | 3/2018 | Chen .................... H01L 33/0062 |
| 2020/0203560 | A1* | 6/2020 | Teo ..................... H01L 33/0004 |

OTHER PUBLICATIONS

Boltasseva, A. et al., "Low-loss plasmonic metamaterials." Science 331.6015 (2011): 290-291.

Cui, Y. et al. "Plasmonic and metamaterial structures as electromagnetic absorbers." Laser & Photonics Reviews 8.4 (2014): 495-520.

Yao, K. et al., "Plasmonic metamaterials." Nanotechnology Reviews 3.2 (2014): 177-210.

* cited by examiner

MICRO LIGHT EMITTING DIODES WITH NANOSTRUCTURES

CROSS REFERENCE TO RELATED APPLICATION

This application is a national stage entry of Patent Cooperation Treaty Application No. PCT/US2020/022617 filed Mar. 13, 2020, entitled "MICRO LIGHT EMITTING DIODES WITH NANOSTRUCTURES," which claims priority to U.S. Provisional Application No. 62/818,970 filed on Mar. 15, 2019, entitled "MICRO LEDS WITH PLASMONIC/METAMATERIAL NANO-STRUCTURES." The disclosures of which are incorporated herein by reference in their entirety.

TECHNICAL FIELD

The present disclosure generally relates to optics and, more specifically, to light emitting diodes.

BACKGROUND

A light emitting diode (LED) may be a p-n junction device formed by joining a p-type semiconductor doped to include excess holes and an n-type semiconductor doped to include excess electrons. The light emitting diode may emit light when an electric current is applied to the light emitting diode, which causes the excess electrons in the n-type semiconductor to recombine with the excess holes in the p-type semiconductor and release energy in the form of photons. The energy required for the excess electrons in the n-type semiconductor to cross the bandgap (e.g., energy gap) of the semiconductor material and become free to recombine with the excess holes in the p-type semiconductor may determine the color of the light emitted by the light emitting diode. For example, a light emitting diode formed a semiconductor material having a bandgap of 1.67 electron-volts (eV) may emit a red-colored light having a wavelength of between 625-760 nanometers.

SUMMARY

Systems, methods, and articles of manufacture are provided for micro light emitting diodes with nanostructures. In one aspect, there is provided an apparatus that includes a micro light emitting diode. The apparatus may include: a light emission layer; a first charge transport layer disposed on the light emission layer; and one or more nanostructures formed by at least removing a portion of the first charge transport layer and depositing a plasmonic metamaterial on a remaining portion of the first charge transport layer, the one or more nanostructures comprising one or more protrusions and recesses formed by the remaining portion of the first charge transport layer, and the one or more nanostructures including the plasmonic metamaterial deposited on the remaining portion of the first charge transport layer.

In some variations, one or more of the features disclosed herein including the following features can optionally be included in any feasible combination. A material composition, a shape, a dimension, a placement, and/or a distribution of the one or more nanostructures may be configured to optimize a quantum efficiency of the light emitting diode.

In some variations, the material composition, the shape, the dimension, the placement, and/or the distribution of the one or more nanostructures that optimizes the quantum efficiency of the light emitting diode may be determined by at least applying one or more numerical methods including a Monte Carlo simulation and/or a finite-different time-domain (FDTD) method.

In some variations, the material composition, the shape, the dimension, the placement, and/or the distribution of the one or more nanostructures that optimizes the quantum efficiency of the light emitting diode may be determined based at least on one or more optical measurements including at least one photoluminescence measurement.

In some variations, the one or more nanostructures may include a first type of nanostructures that are less than a threshold distance away from a sidewall of the light emitting diode.

In some variations, the first type of nanostructures may be optimized by determining a first material composition, a first shape, a first dimension, a first placement, and/or a first distribution of the first type of nanostructures to maximize a quantum efficiency at the sidewall of the light emitting diode.

In some variations, the one or more nanostructures may further include a second type of nanostructures that are a diffusion length away from the sidewall of the light emitting diode. The diffusion length may correspond to an average distance traveled by a carrier in a semiconductor material forming the light emitting diode between a generation of the carrier and a recombination of the carrier.

In some variations, the second type of nanostructures may be optimized by determining a second material composition, a second shape, a second dimension, a second placement, and/or a second distribution of the second type of nanostructures to maximize an emission of a carrier energy as visible light before the carrier energy is quenched by the sidewall of the light emitting diode.

In some variations, the one or more nanostructures may further include a third type of nanostructures that are more than the diffusion length away from the sidewall of the light emitting diode.

In some variations, the third type of nanostructures may be optimized by determining a third material composition, a third shape, a third dimension, a third placement, and/or a third distribution of the third type of nanostructures to maximize a quantum efficiency of the third type of nanostructures.

In some variation, the first type of nanostructures may be optimized prior to the second type of nanostructures and/or the third type of nanostructures.

In some variation, the first type of nanostructures may be optimized but not the second type of nanostructures and/or the third type of nanostructures.

In some variations, the light emitting diode may be less than 100 microns in size.

In some variations, the light emitting diode may be between 0.1 microns and 10 microns in size.

In some variations, the one or more nanostructures may be further formed by removing a portion of the light emission layer and depositing the plasmonic metamaterial inside the recesses formed in the remaining portion of the light emission layer. The one or more nanostructures may be further formed by depositing at least a portion of the first charge transport layer on top of the plasmonic metamaterial and the remaining portion of the light emission layer.

In some variations, the one or more protrusions and recesses may form one or more channels and/or indentations in the first charge transport layer and/or the light emission layer.

In some variations, the light emitting diode may further include a second charge transport layer, a buffer layer, and a substrate. The second charge transport layer may be disposed on the substrate. The buffer layer may be interposed between the light emission layer and the second charge transport layer.

In some variations, the light emitting diode may further include an isolation layer forming an interface between at least a portion of the plasmonic metamaterial and the first charge transport layer, the light emission layer, and/or the second charge transport layer.

In some variations, the light emitting diode may further include one or more contacts and bonding pads.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to micro light emitting diodes, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar elements in the drawings.

DETAILED DESCRIPTION

Figure 1A:
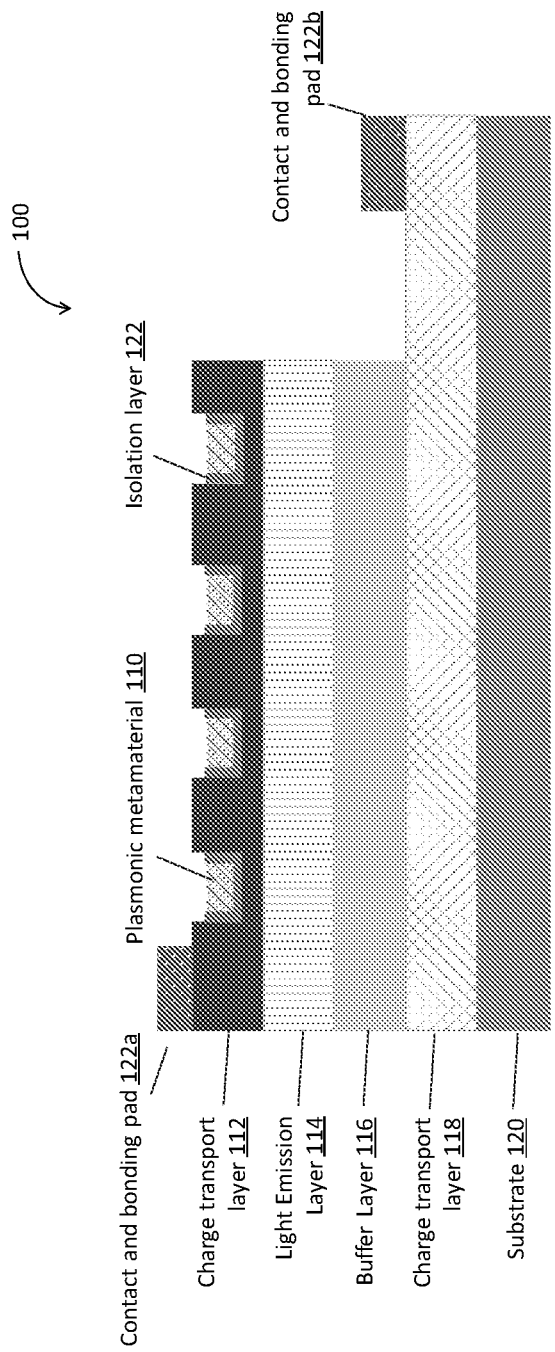
FIG. 1A depicts a cross sectional view of an example of a light emitting diode, in accordance with some example embodiments.

Light emitting diode displays in wearable devices, such as smartwatches, smart glasses, and virtual reality headsets, may require microscale pixels (e.g., 5 microns or less). Although a conventional light emitting diode may be scaled below 1 micron in size, the efficiency of a conventional light emitting diode is severely impacted by its size. That is, reducing the size of a conventional light emitting diode may significantly reduce its quantum efficiency. A conventional microscale light emitting diode may therefore consume more power in order to achieve the light intensity required for a light emitting diode display. As such, conventional light emitting diodes may be unsuitable for a variety of microscale applications. For example, a light emitting diode display fabricated from conventional microscale light emitting diodes may consume excessive power and be susceptible to thermal breakdown.

In some example embodiments, the efficiency a light emitting diode, in particular a microscale light emitting diode that is less than 100 microns in size, may be optimized by including one or more nanostructures. For example, the light emitting diode may include a plasmonic metamaterial layer, a charge transport layer, and a light emission layer disposed on top of a substrate layer, with the one or more nanostructures being fabricated proximately to or in the light emission layer. For instance, a portion of the charge transport layer and/or the light emission layer may be removed such that a remaining portion of the charge transport layer and/or the light emission layer may include one or more protrusions and recesses including, for example, channels, indentations, and/or the like. The plasmonic metamaterial may be disposed on the remaining portion of the charge transport layer and/or the light emission layer including, for example, on top of the protrusions as well as in the recesses formed by the remaining portion of the charge transport layer and/or the light emission layer.

Each of the resulting nanostructures may include a portion of the plasmonic metamaterial and the charge transport layer as well as, in some instances, the light emission layer.

Moreover, these nanostructures may serve as optical antennas configured to optimize the propagation of light from the light emission layer such that a maximum quantity of light from the light emission layer is projected outward, for example, as visible light output by the light emitting diode. This may be achieved, for example, by minimizing the quantity of light that is directed sideways towards the sidewall of the light emitting diode, where the light is quenched by the sidewall of the light emitting diode instead of being output as visible light. In doing so, the nanostructures may maximize the light intensity of the light emitting diode without requiring any additional power input into the light emitting diode.

In some example embodiments, the shape, dimension, placement, and distribution of these nanostructures may be configured to maximize the quantum efficiency of the light emitting diode such that the light emitting diode, even at a microscale (e.g., less than 100 microns in size) may achieve sufficient light intensity without consuming excessive power. For example, the shape, dimension, placement, and/or distribution of the nanostructures may be uniform across at least a portion of the light emitting diode. Alternatively, the shape, dimension, placement, and/or distribution of the nanostructures may vary across at least a portion of the entire light emitting diode or across regions of the light emitting diode. For instance, a first region of the light emitting diode may be occupied by nanostructures having a first material composition, a first shape, a first dimension, a first placement, and/or a first distribution. Meanwhile, a second region of the light emitting diode may not include any nanostructures or may be occupied by nanostructures having a second material composition, a second shape, a second dimension, a second placement, and/or a second distribution.

FIG. 1A depicts a cross sectional view of an example of a light emitting diode 100, in accordance with some example embodiments. Referring to FIG. 1A, the light emitting diode may include a plurality of layers including, for example, a plasmonic metamaterial 110, a charge transport layer 112, and a light emission layer 114. As shown in FIG. 1A, the charge transport layer 112 or a spacer isolation layer may be interposed between the plasmonic metamaterial 110 and the light emission layer 114. Furthermore, the plasmonic metamaterial 110, the charge transport layer 112, and the light emission layer 114 may be disposed on top of a substrate 120, with an optional buffer layer 116 and another charge transport layer 118 interposed therebetween. The light emitting diode 100 may further include one or more contacts and/or bonding pads (e.g., a contact and a first bonding pad 122a, a second bonding pad 122b, and/or the like) for establishing an electrical connection with the light emitting diode 100.

In some example embodiments, the light emitting diode 100 may be a microscale light emitting diode that is less than 100 microns in size. For example, according to some example embodiments, the light emitting diode 100 may be between 0.1 microns and 10 microns. To optimize the quantum efficiency of the light emitting diode 100, the light emitting diode 100 may include one or more nanostructures that enable the light emitting diode 100 to achieve sufficient light intensity without consuming excessive power. For example, the one or more nanostructures may be formed from protrusion and recesses (e.g., channels, indentations, and/or the like) formed into the plasmonic metamaterial 110 and the charge transport layer 112. Alternatively, the one or more nanostructures may be embedded into at least a portion of the charge transport layer 112 and/or the light emission layer 114.

In some example embodiments, the one or more nanostructures may be formed proximate to or, in some instances, into the light emission layer 114. Moreover, the shape, dimension, placement, and/or distribution of the nanostructures may be configured to optimize the quantum efficiency of the light emitting diode 100. As shown in FIG. 1A, the placement and/or distribution of the nanostructures may include a relative placement of two or more nanostructures (e.g., a distance between two or more adjacent nanostructures). The placement and/or distribution of the nanostructures may also include the distance between the plasmonic metamaterial 110 and the light emission layer 114 (e.g., a first distance $d_1$, a second distance $d_2$, a third distance $d_3$, and/or the like). An isolation layer 122 (e.g., having a thickness of a fourth distance $d_4$) may be disposed at least partially around the plasmonic metamaterial 110 to form an interface between the plasmonic metamaterial 110 and the charge transport layer 112 and/or the light emission layer 114.

In the example of the light emitting diode 100 shown in FIG. 1A, the one or more nanostructures may be formed proximate to the light emission layer 114. For example, as shown in FIG. 1A, a portion of the charge transport layer 112 may be removed such that the remaining portion of the charge transport layer 112 may include one or more protrusions and recesses including, for example, channels, indentations, wells, and/or the like. The plasmonic metamaterial 110 may be disposed inside the recesses such that each resulting nanostructure may include a portion of the plasmonic metamaterial 110 disposed in a recess within the charge transport layer 112 with the isolation layer 122 disposed therebetween. Moreover, the nanostructures may be disposed proximate to the light emission layer 114, for example, at a distance that is configured to maximize the outward projection of the light emitted by the light emission layer 114.

Figure 1B:
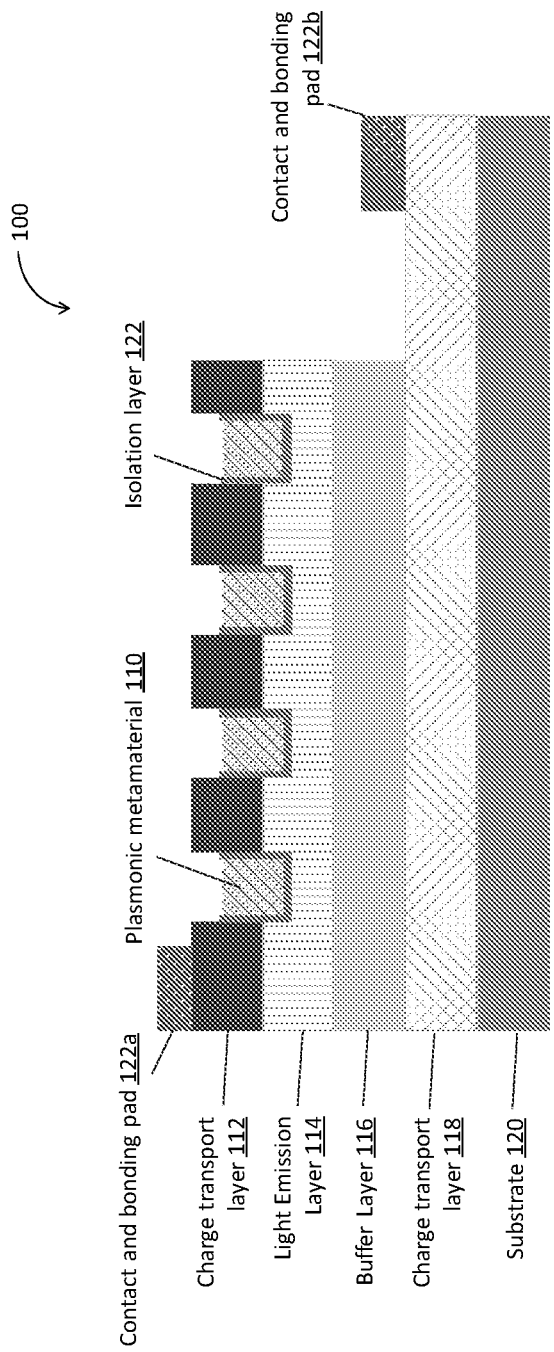
FIG. 1B depicts a cross sectional view of another example of a light emitting diode, in accordance with some example embodiments.

Alternatively, the one or more nanostructures may be fabricated into and/or to include the light emission layer 114. To further illustrate, FIG. 1B depicts a cross sectional view of another example of the light emitting diode 100, in accordance with some example embodiments. In the example of the light emitting diode 110 show in FIG. 1B, the one or more nanostructures are formed into the light emission layer 114, for example, at a depth corresponding to a fifth distance $d_5$, by removing a portion of the charge transport layer 112 as well as the light emission layer 114 underneath the charge transport layer 112. The remaining portion of the charge transport layer 112 and the light emission layer 114 may include one or more protrusions and recesses (e.g., channels, indentations, and/or the like). The plasmonic metamaterial 110 may be disposed inside the recesses formed into the charge transport layer 112 and the light emission layer 114, with the isolation layer 122 forming an interface between the plasmonic metamaterial 110 and the charge transport layer 112 and the light emission layer 114.

Figure 1C:
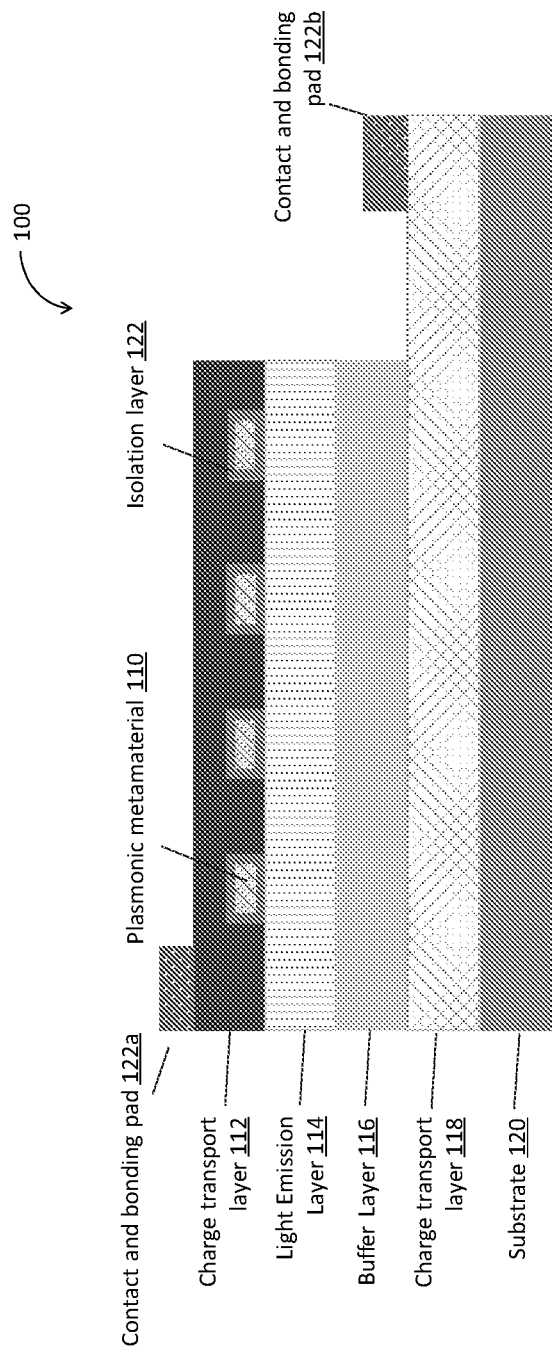
FIG. 1C cross sectional view of another example of a light emitting diode, in accordance with some example embodiments.
Figure 1D:
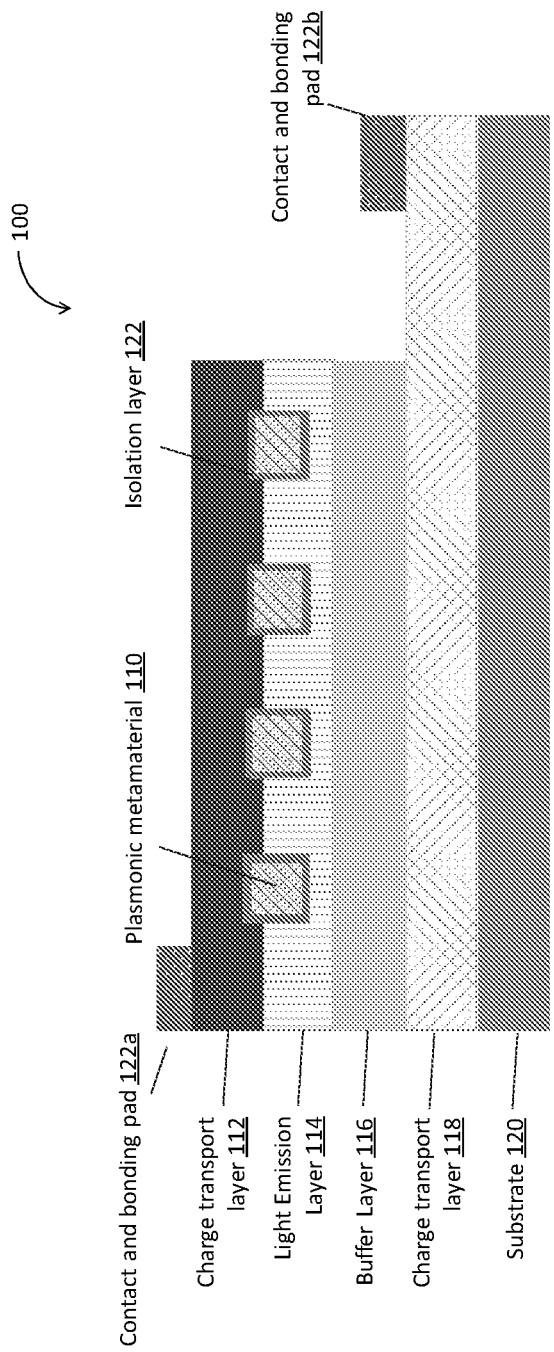
FIG. 1D cross sectional view of another example of a light emitting diode, in accordance with some example embodiments.

FIGS. 1C-D depict a cross sectional view of additional examples of the light emitting diode 100 in which the one or more nanostructures are embedded into the charge transport layer 112 and/or the light emission layer 114. In the example of the light emitting diode 100 shown in FIG. 1C, the one or more nanostructures may be formed by portions of the plasmonic metamaterial 110 embedded in the charge transport layer 112, with the isolation layer 122 forming an interface between each portion of the plasmonic metamaterial 110 and the charge transport layer 112 surrounding the plasmonic metamaterial 110. Alternatively, in the example of the light emitting diode 100 shown in FIG. 1D, the one or more nanostructures may be formed by portions of the plasmonic metamaterial 110 embedded into the charge transport layer 112 as well as the light emission layer 114 (e.g., at a depth corresponding to the fifth distance $d_5$). As shown in FIG. 1D, the isolation layer 112 may form an interface between each portion of the plasmonic metamaterial 110 and the charge transport layer 112 and/or the light emission layer 114 surrounding the plasmonic metamaterial 110.

In some example embodiments, the plasmonic metamaterial 110 may be structure that includes at least one of a dielectric or a metal. The plasmonic metamaterial 110 may exhibit superior sub-wavelength light focusing capability and density of states (DOS) modification capability at least because the electrons in the plasmonic metamaterial 110 may oscillate in response to excitons from the light emission layer 114. The nanostructures, which include portions of the plasmonic metamaterial 110, may provide a large density of states modification at selected oscillation frequency. The speed of which the nanostructures in the light emitting diode 100 may accept excitons from the light emission layer and output a photon of light is defined by Equation (1) below.

$$U_{modified} = F_p \times U_{unmodified} \quad (1)$$

wherein $U_{modified}$ may denote the emission rate prior to modification by the plasmonic metamaterial 110, $U_{modified}$ may denote the emission rate subsequent to modification by the plasmonic metamaterial 110, and $F_p$ may denote the Purcell factor quantifying the emission rate enhancement.

The Purcell factor $F_p$ may be determined by the optical density of state enhancement. In practice, the magnitude of the Purcell factor $F_p$ may be maximized by spectrum matching and spatial matching. Spectrum matching may be one key parameter for maximizing the Purcell factor $F_p$ at least because the density of state enhancement is wavelength dependent. As such, the amplitude of the Purcell factor $F_p$ may be wavelength dependent and may therefore be maximized when its peak matches the emission peak of the light emission layer 114.

Furthermore, maximizing the magnitude of the Purcell factor $F_p$ may also require spatial matching because the density of state enhancement may be confined to a small volume within distance (e.g., as short as ~40 nanometers for silver (Ag) on a gallium nitride (GaN) semiconductor at a 440 nanometer wavelength) while the enhancement amplitude may be inversely proportional to distance. Accordingly, the light emission layer 114 may be in proximity to the plasmonic metamaterial 110 in order for the nanostructures to maximize the quantity of light output by the light emitting diode 100, which in part requires a high magnitude $F_p$ indicative of the plasmonic metamaterial 110 turning excitons from the light emission layer 114 into light at an optimal speed.

Figure 2A:
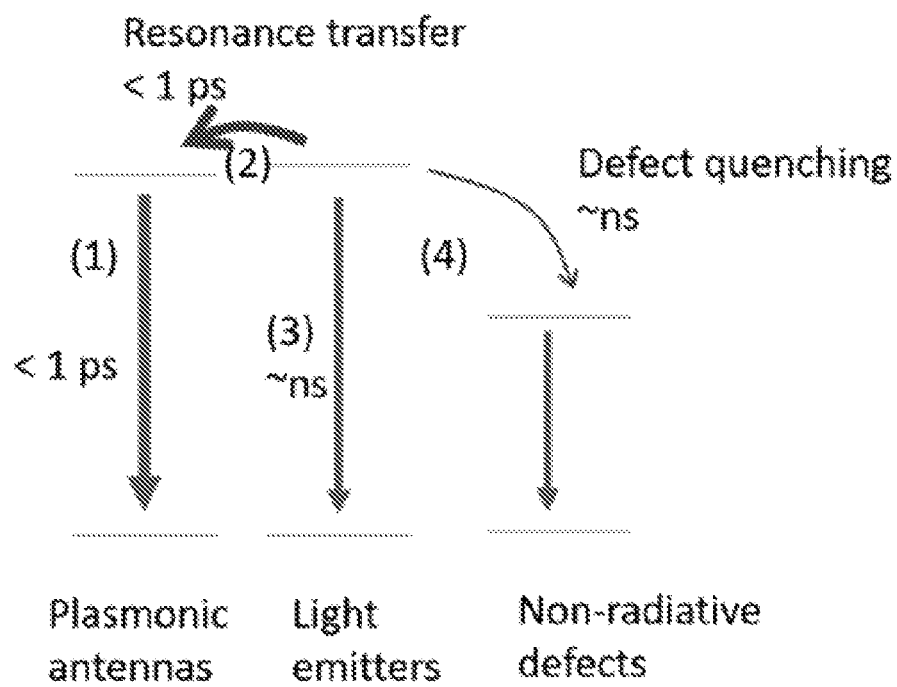
FIG. 2A depicts various recombination pathways in a light emitting diode, in accordance with some example embodiments.
Figure 2B:
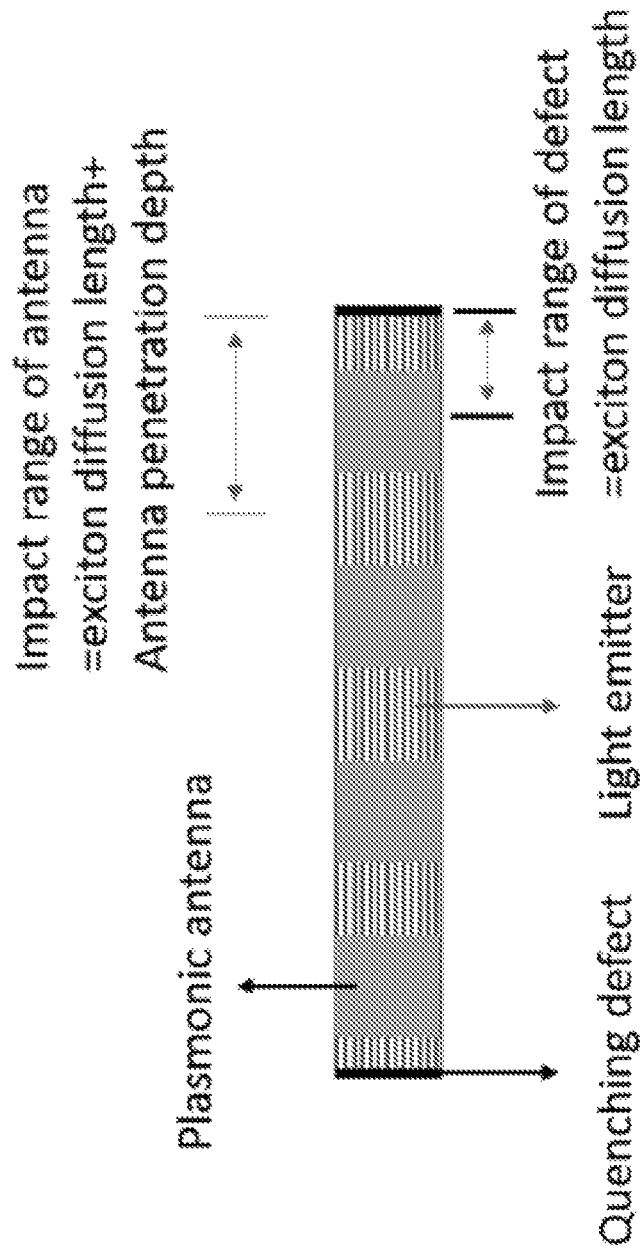
FIG. 2B depicts the impact range of a plasmonic metamaterial nanostructure relative to the impact range of sidewall surface defects, in accordance with some example embodiments.

FIG. 2A depicts various recombination pathways in the light emitting diode 100, in accordance with some example embodiments. In the examples of the light emitting diode 100 shown in FIGS. 1A-B, pathway (2) out the plasmonic metamaterial 110 may be overwhelming faster than pathway (3) through the light emission layer 114 and pathway (4) towards the sidewall of the light emitting diode 110. Accordingly, most of the decay may go through process (1), which may be very efficient with a radiative quantum efficiency from 10% to 90%, depending on the material and configuration of the plasmonic metamaterial 110, which may include the shape, dimension, placement, and distribution of the nanostructures formed to include portions of the plasmonic metamaterial 110. For example, as shown in FIG. 2B, the nanostructures may be placed within the distance of $d_{exciton\ diff} + d_{antenna}$ to the light emitter in the emission layer 114 and within the distance of $d_{exciton\ diff}$ to the sidewalls of the light emitting diode 100 where a quenching defect may be present.

Configured as such, the light emitting diode 100 may output light primarily through pathway (1) and may therefore retain 10-90% quantum efficiency. Moreover, the light emitting diode 100 may exhibit a higher outcoupling efficiency because the light emitting diode 100 may exhibit a strong scattering effect and may thus exhibit a similar external quantum efficiency at various sizes including, for example, at a microscale (e.g., less than 100 microns, between 0.1 microns and 10 microns, and/or the like). The fast decay rate of the light emitting diode 100 may further exhibit an inhibited efficiency roll-off at high current density, which has been a long-unresolved problem in high power light emitting diodes (e.g., gallium nitride (GaN) based light emitting diodes).

Figure 3A:
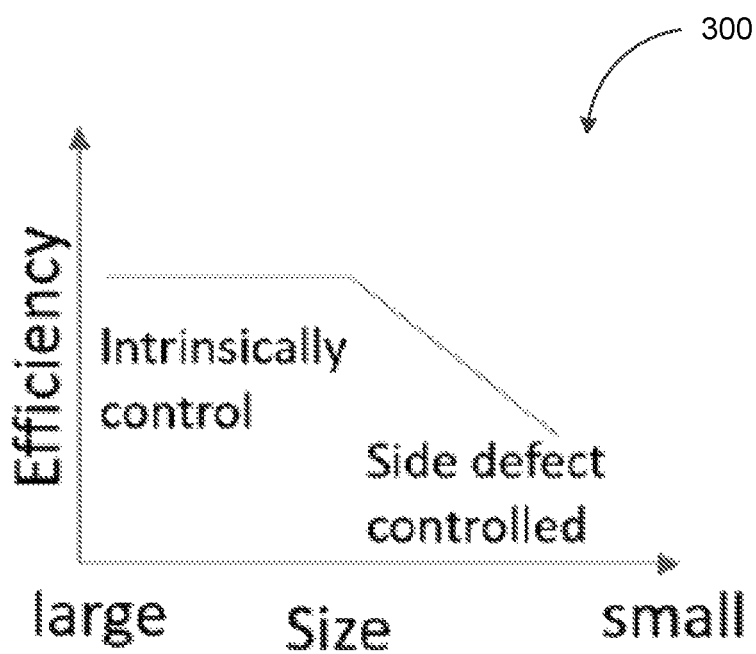
FIG. 3A depicts a graph illustrating a relationship between a size and a quantum efficiency of a conventional light emitting diode, in accordance with some example embodiments.
Figure 3B:
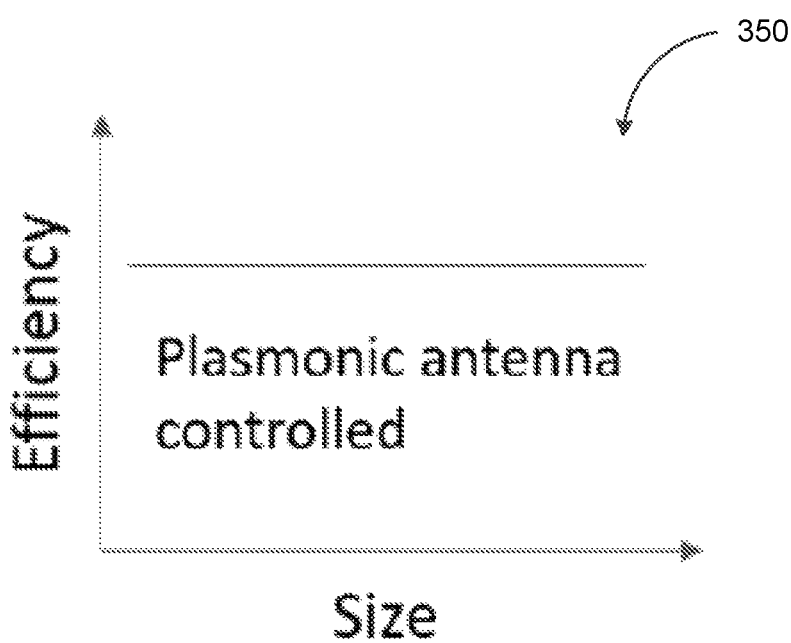
FIG. 3B depicts a graph illustrating a relationship between a size and a quantum efficiency of a light emitting diode having plasmonic metamaterial nanostructures, in accordance with some example embodiments.

To further illustrate, FIG. 3A depicts a graph 300 illustrating a relationship between the size and quantum efficiency of a conventional light emitting diode while FIG. 3B depicts a graph 350 illustrating a relationship between the size and quantum efficiency of a light emitting diode having plasmonic metamaterial nanostructures such as, for example, the light emitting diode 100. As shown in FIG. 3A, as the radius of a conventional light emitting diode approaches and goes below $d_{exciton\ diff}$, the conventional light emitting diode may exhibit a reduction in quantum efficiency. This reduction in quantum efficiency, which may be attributable to light being quenched by the sidewall of the light emitting diode instead of being projected outward, may be especially dramatic in a conventional microscale light emitting diode.

Contrastingly, as shown in FIG. 3B, the light emitting diode 100, which may have plasmonic metamaterial nanostructures covering the entire area of the light emitting diode 100, may exhibit minimal size and quantum efficiency dependency. Moreover, the quantum efficiency of the light emitting diode 100 may be high (e.g., approximately 80-90%) and remain high even as the size of the light emitting diode 100 drops below $d_{exciton\ diff}$.

In some example embodiments, the shape, dimension, placement, and distribution of the nanostructures included in the light emitting diode 100 may be configured to optimize the quantum efficiency of the light emitting diode 100 such that the light emitting diode 100, even at a microscale (e.g., less than 100 microns in size, between 0.1 microns and 10 microns in size, and/or the like) may achieve sufficient light intensity without consuming excessive power. For example, the shape, dimension, placement, and/or distribution of the nanostructures may be uniform across at least a portion of the entire light emitting diode 100. Alternatively, the material composition, shape, dimension, placement, and/or distribution of the nanostructures may vary across at least a portion of the light emitting diode 100 or across regions of the light emitting diode 100. For instance, a first region of the light emitting diode 100 may be occupied by nanostructures having a first material composition, a first shape, a first dimension, a first placement, and/or a first distribution. Meanwhile, a second region of the light emitting diode 100 may not include any nanostructures or the second region of the light emitting diode 100 may be occupied by nanostructures having a second material composition, a second shape, a second dimension, a second placement, and/or a second distribution.

Figure 4:
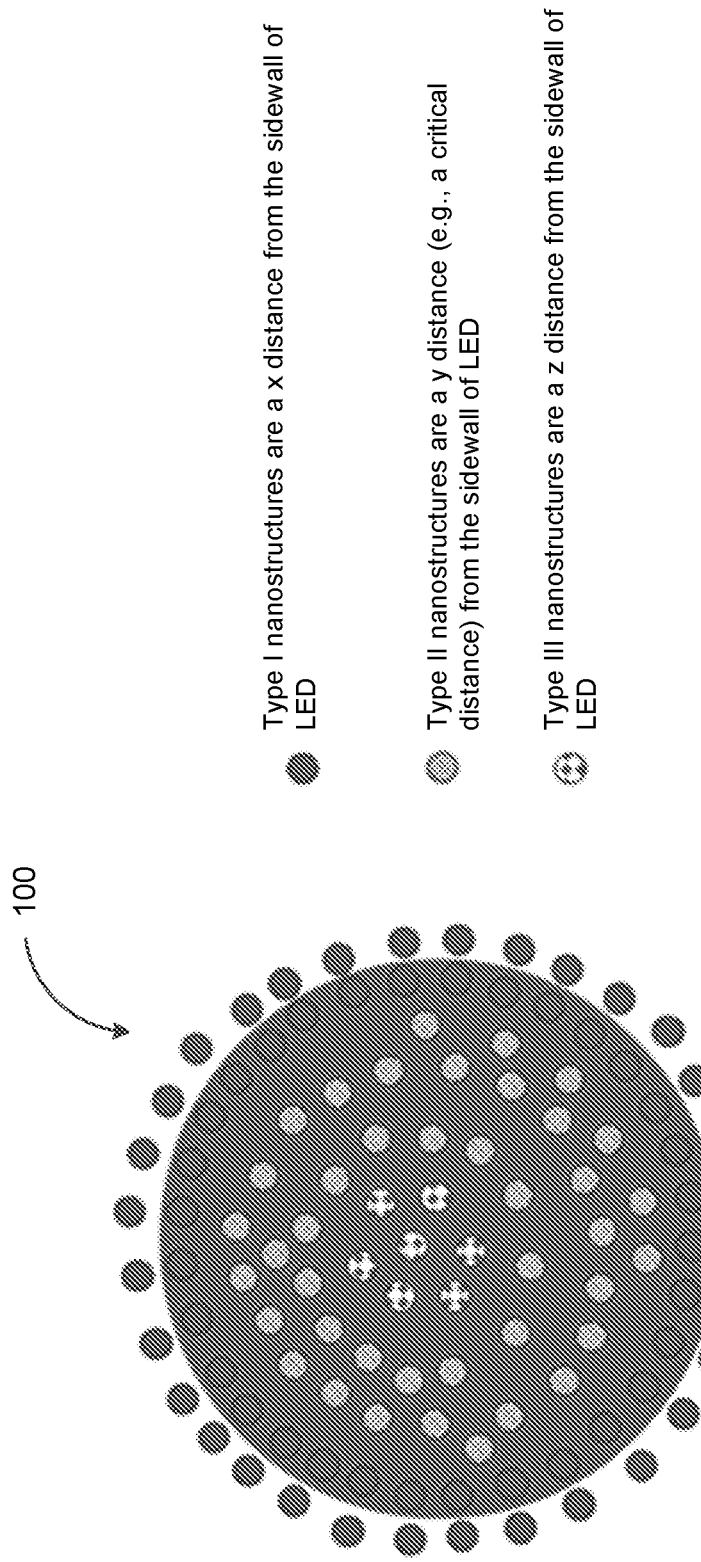
FIG. 4 depicts a top view of the light emitting diode having an example distribution of nanostructures, in accordance with some example embodiments.

FIG. 4 depicts a top view of the light emitting diode 100 having an example distribution of nanostructures, in accordance with some example embodiments. Referring to FIG. 4, the light emitting diode 100 may include one or more types of nanostructures, differentiated by a distance relative to the sidewall of the light emitting diode 100. For instance, in the example shown in FIG. 4, the light emitting diode 100 may include a first type of nanostructures that are an x distance away from the sidewall of the light emitting diode 100, a second type of nanostructures that are a y distance away from the sidewall of the light emitting diode 100, and a third type of nanostructures that are a z distance away from the sidewall of the light emitting diode 100. It should be appreciated that x<y<z and that y may be a critical distance such as, for example, one diffusion length, which may correspond to an average distance traveled by a carrier (e.g., an electron or an electron hole) in the semiconductor material forming the light emitting diode 100 between a generation of the carrier and a recombination of the carrier.

Referring again to FIG. 4, the first type of nanostructures that are an x distance away from the sidewall of the light emitting diode 100 may be adjacent to the sidewall of the light emitting diode 100. That is, the first type of nanostructures may be less than a threshold distance away from the sidewall of the light emitting diode 100 and may thus be required to compete with the quenching effects of the sidewall directly. As shown in FIG. 4, the first type of nanostructures may be disposed inside as well as outside of the sidewall of the light emitting diode 100. The quantum efficiency of the first type of nanostructures may be maximized in accordance with Equation (2) below, which includes maximizing the quantum efficiency of the light emitting diode at its sidewall $QE_{sidewall}$.

$$QE_{sidewall} = \frac{F_{p1} \times R_{rad} \times QE_{antenna\_1}}{F_{p1} \times R_{rad} + R_{non-rad} + R_{quenching}} \quad (2)$$

wherein $R_{rad}$ may denote the radiative rate of the light emission layer 114, $R_{non-rad}$ may denote the non-radiative rate of the light emission layer 114, $R_{quenching}$ may denote the quenching rate of the sidewall of the light emitting diode 100, $F_p$ may denote the Purcell factor of the nanostructure, and $QE_{antenna}$ may denote the quantum efficiency of the nanostructure.

The second type of nanostructures may be disposed from side wall to ay distance away from the sidewall of the light emitting diode 100. While the second type of nanostructures are not adjacent to the sidewall of the light emitting diode 100 (e.g., y>x), the distance y may nevertheless be a critical distance such that the second type of nanostructures may maximize the emission of the carrier energies (e.g., as visible light) before the carrier energies are quenched by the sidewall of the light emitting diode. For example, the distance y may be one diffusion length, which may be approximately $$\frac{1}{R_{rad} + R_{non-rad}}.$$

Moreover, the quantum energy enhancement factor $Factor_{typeII}$ of the second type of nanostructures may be expressed by equation (3) below.

$$Factor_{typeII} = \frac{(L - L') \times QE_{antenna\_2} + L' \times QE_{sidewall}}{L \times QE_{sidewall}} \quad (3)$$

wherein $L'$ may denote the modified diffusion length of the nanostructures, which may be approximately $$L' = \frac{1}{(F_{p2} \times R_{rad} + R_{non-rad})}.$$

The third type of nanostructures, being a z distance away from the sidewall of the light emitting diode 100, may be more than a single diffusion length away from sidewall (e.g., z>y>x). The third type of nanostructures may provide minimal contribution towards improving the quantum efficiency of the light emitting diode 100. In some example embodiments, the third type of nanostructures may be omitted altogether from the light emitting diode 100. However, it should be appreciated that the third type of nanostructures may be necessary for some applications and/or manufacturing processes. For example, the presence of these nanostructures, albeit relatively far away from the sidewall of the light emitting diode 100, may improve the emission uniformity of the light emitting diode 100 if these nanostructures have substantially the same level of emission as the other types of nanostructures in the light emitting diode 100. Accordingly, in cases where the light emitting diode 100 includes the third type of nanostructures, the third type of nanostructures should be configured to exhibit maximum quantum efficiency $QE_{antenna\_3}$ while the Purcell factor $F_{p3}$ of the third type of nanostructures may be less critical.

In some example embodiments, optimizing the configuration of the nanostructures in the light emitting diode 100 may include prioritizing the optimization of those nanostructures that are closer to the sidewall of the light emitting diode 100. For example, optimizing the example of the light emitting diode 100 shown in FIG. 4 may include optimizing the first type of nanostructures to maximize the quantum efficiency of the sidewall $QE_{sidewall}$ before optimizing the quantum energy enhancement factor $Factor_{typeII}$ of the second type of nanostructures and the quantum efficiency $QE_{antenna\_3}$ of the third type of nanostructures. It should be appreciated that the optimizations may extend to include some but not all of the types of nanostructures included in the light emitting diode 100. Moreover, the optimizations may be application specific and may extend beyond the geometric attributes (e.g., the shape, dimensions, placement, and distribution) of the nanostructures to include the composition of nanostructures and the light emitting diode 100 itself including, for example, the materials forming the nanostructures, the materials forming the light emitting diode 100, the thickness of the layers of the light emitting diode 100, and/or the like. Various numerical optimizations may be applied including, for example, Monte Carlo simulations, finite-difference time-domain methods (FDTD), and/or the like. Alternatively and/or additionally, the optimizations may be performed based on optical measurements such as, for example, photoluminescence measurements and/or the like.

Figures 5A, 5B, 5C:
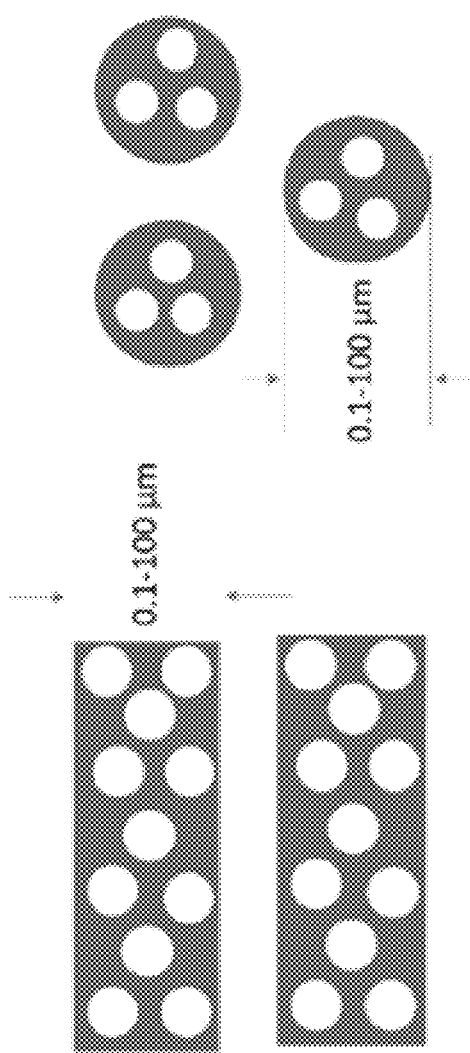
FIG. 5A depicts a top view of an example of a light emitting diode, in accordance with some example embodiments.
FIG. 5B depicts a top view of another example of a light emitting diode, in accordance with some example embodiments.
FIG. 5C depicts a top view of another example of a light emitting diode, in accordance with some example embodiments.

In some example embodiments, the light emitting diode 100 may be configured to achieve a variety of form factors as shown in FIGS. 5A-C. For example, FIG. 5A depicts a rectangular shaped light emitting diode 100, FIG. 5B depicts a circular shaped light emitting diode 100, and FIG. 5C depicts an arbitrarily shaped light emitting diode 100. Regardless of form factor, the light emitting diode 100 may include the plasmonic metamaterial 110, which may be deposited on top of the charge transport layer 112 and the light emission layer 114. One or more nanostructures may be formed from the plasmonic metamaterial 110 and the charge transport layer 112 to be proximate to or in the light emission layer 114. These nanostructures may, as noted, serve as optical antennas that optimize the propagation of light from the light emission layer 114 such that a maximum quantity of light from the light emission layer 114 is projected outward, for example, as visible light output by the light emitting diode 100 while a minimum quantity of light from the light emission layer 114 is directed sideways towards the sidewall of the light emitting diode 100, where the light is quenched by the sidewall of the light emitting diode 100 instead of being output as visible light.

Figure 6:
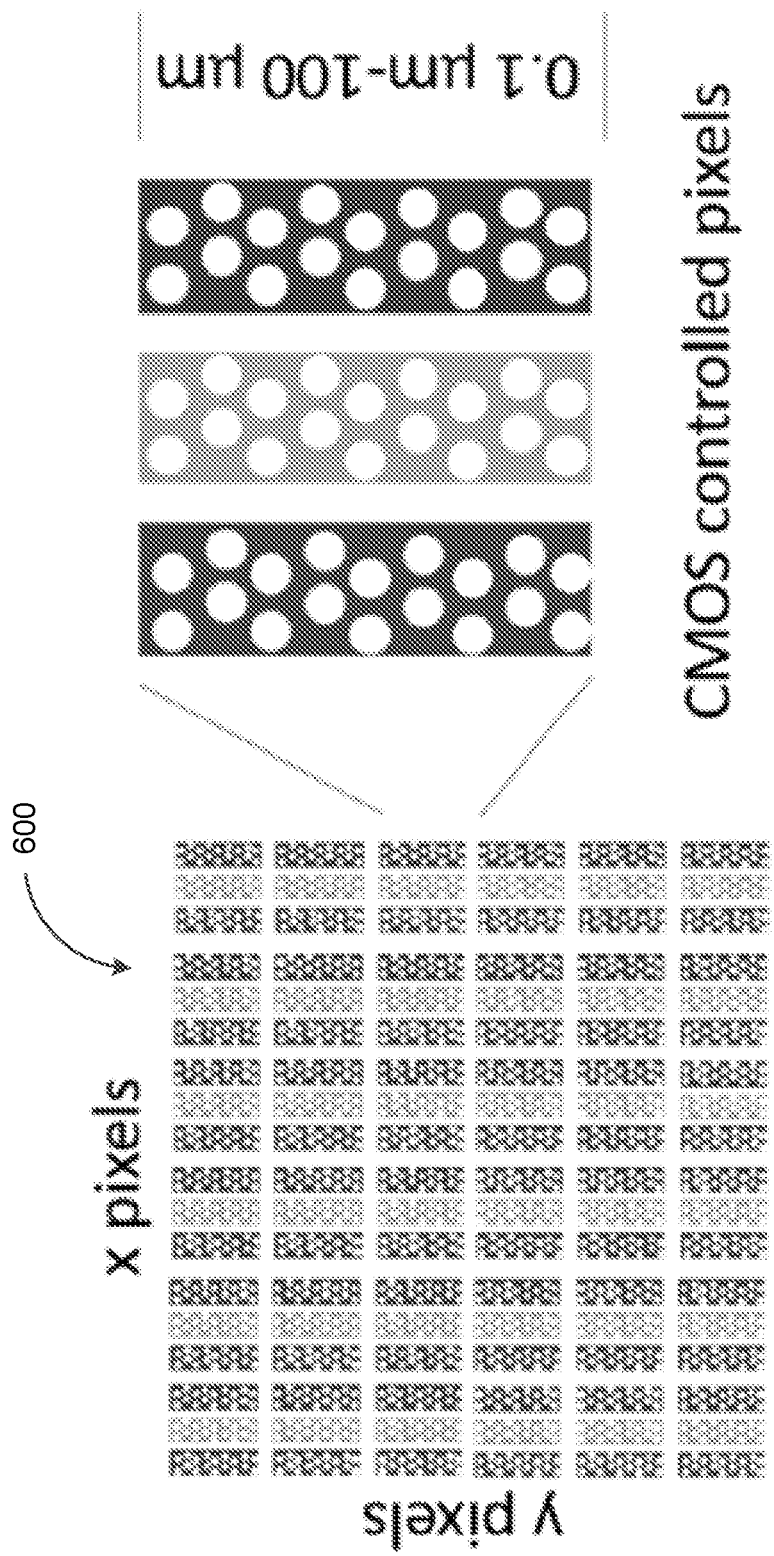
FIG. 6 depicts an example of light emitting diode display, in accordance with some example embodiments.

FIG. 6 depicts an example of a light emitting diode display 600, in accordance with some example embodiments. The example of the light emitting diode display 600 may be formed from a plurality of light emitting diodes having a plasmonic metamaterial nanostructures such as, for example, the light emitting diode 100. For example, as shown in FIG. 6, a single pixel in the light emitting diode display 600 may include a red light emitting diode, a green light emitting diode, and a blue light emitting diode that operate together to produce a full color spectrum. Each pixel in the light emitting diode display 600 may be microscale, for example, ranging from 0.1 microns to 10 microns in size. Accordingly, the light emitting diode display 600 may be high resolution as well as compact. For example, with 5 micron pixel periods, the light emitting diode display 600 may be a 1.28×0.8 centimetre display with a 2560×1600 pixel resolution.

Figure 7A:
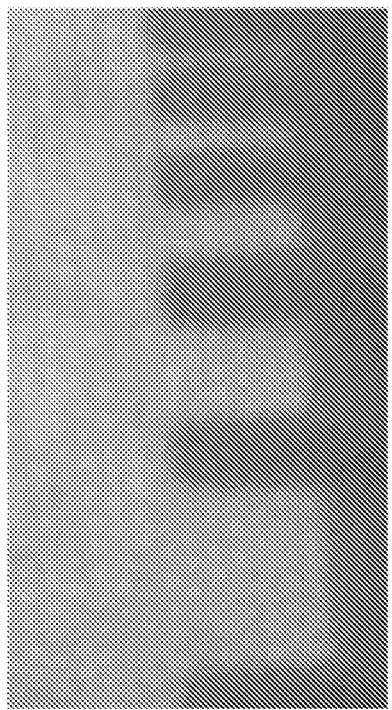
FIG. 7A depicts an optical microscopy image of conventional light emitting diodes, in accordance with some example embodiments.
Figure 7B:
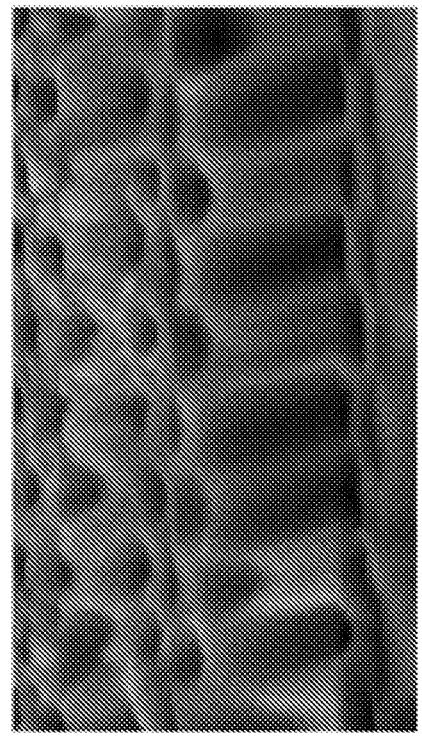
FIG. 7B depicts a camera mapping of a conventional light emitting diodes, in accordance with some example embodiments.
Figure 7C:
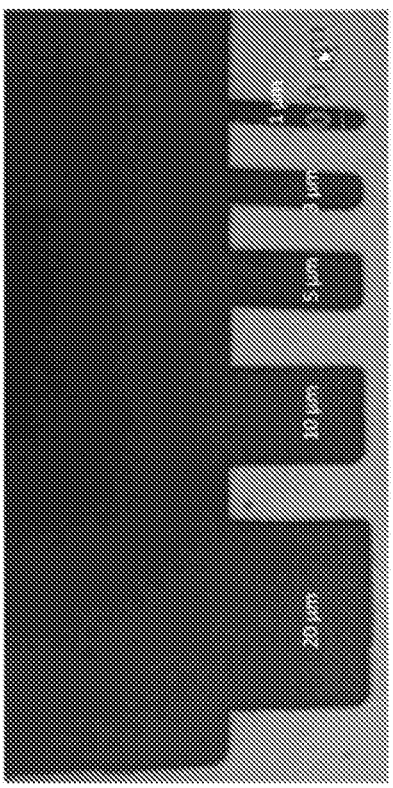
FIG. 7C depicts various microscale light emitting diodes prior to the deposition of plasmonic metamaterial nanostructures, in accordance with some example embodiments.
Figure 7D:
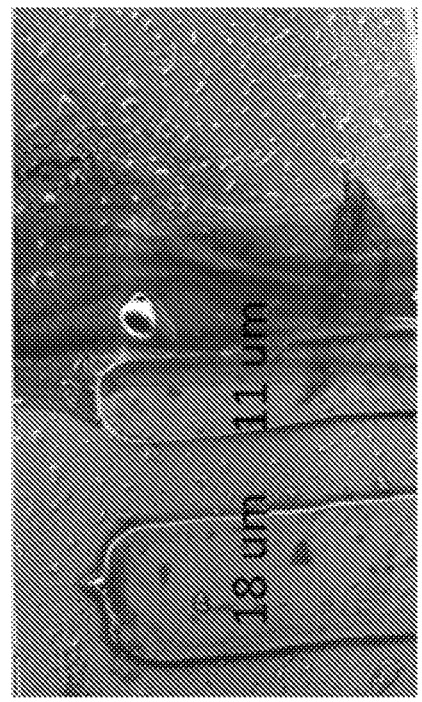
FIG. 7D depicts a cross sectional view of microscale light emitting diodes prior to deposition of plasmonic metamaterial nanostructures, in accordance with some example embodiments.

FIG. 7A depicts an optical microscopy image of conventional microscale light emitting diodes that are 20 microns, 10 microns, 5 microns, 3 microns, and 1 microns in size. When lit up, as depicted in the camera mapping shown in FIG. 7B, these conventional microscale light emitting diodes exhibit a noticeable decrease in light intensity when the size of the light emitting diodes decrease. FIG. 7C depicts an 18-micron light emitting diode and a 11-micron light emitting diode prior to the deposition of plasmonic metamaterial nanostructures. FIG. 7D depicts a cross sectional view of the 18-micron light emitting diode and the 11-micron light emitting diode prior to the deposition of plasmonic metamaterial nanostructures. As noted, the presence of plasmonic metamaterial nanostructures in microscale light emitting diodes may minimize the size-dependent quantum efficiency degradation associated with conventional microscale light emitting diodes.

Figure 8A:
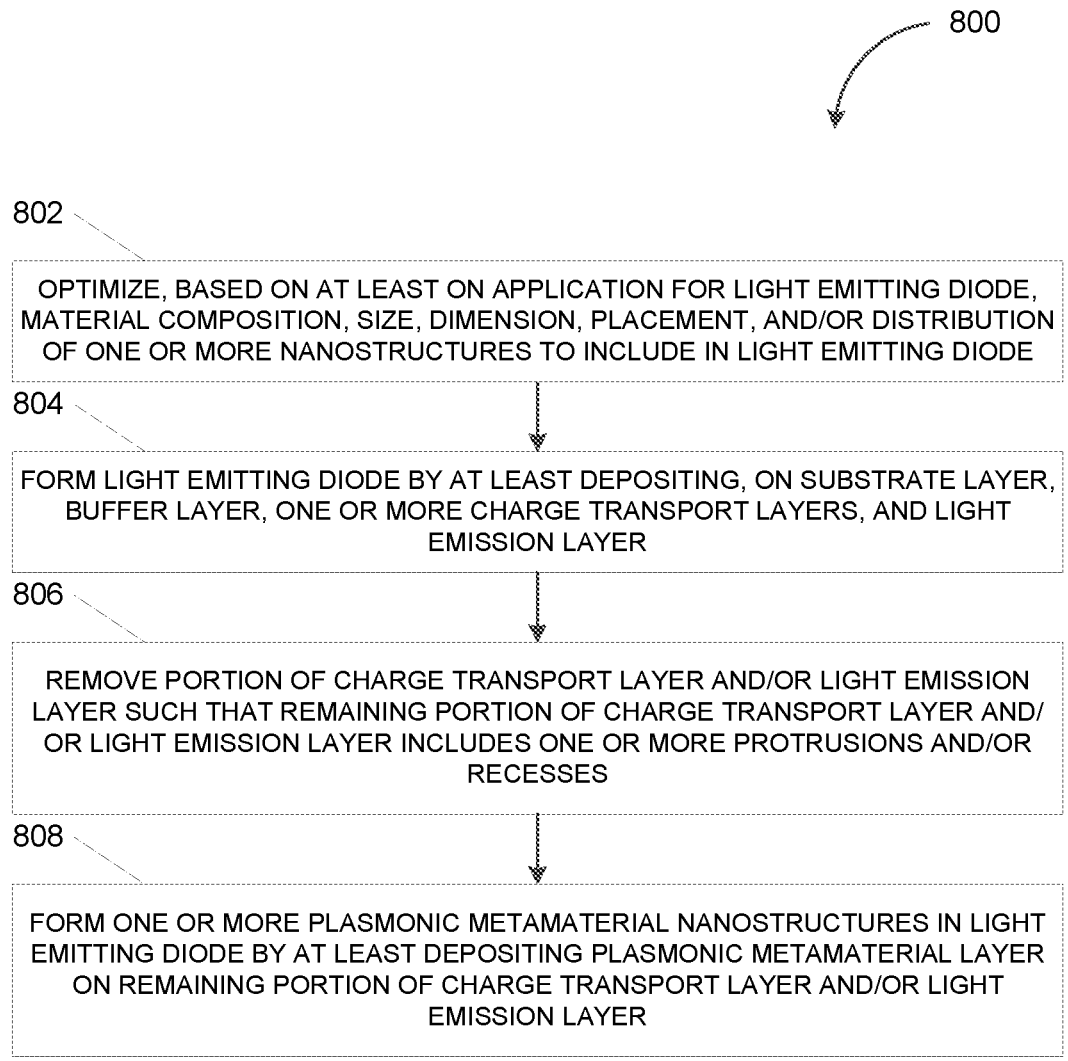
FIG. 8A depicts a flowchart illustrating an example of a process for fabricating an light emitting diode, in accordance with some example embodiments.

FIG. 8A depicts a flowchart illustrating an example of a process 800 for fabricating an light emitting diode, in accordance with some example embodiments. In some example embodiments, the process 800 may be performed in order to fabricate the light emitting diode 100, which may include one or more plasmonic metamaterial nanostructure configured to optimize the quantum efficiency of the light emitting diode 100 such that the light emitting diode 100, even at a microscale of between 0.1 microns and 10 microns, may achieve sufficient light intensity without consuming excessing power.

At 802, the material composition, size, dimension, placement, and/or distribution of one or more nanostructures to include in the light emitting diode 100 may be optimized based at least on an application for the light emitting diode 100. In some example embodiments, the shape, dimension, placement, and distribution of the nanostructures may be configured to maximize the quantum efficiency of the light emitting diode 100 such that the light emitting diode 100, even at a microscale (e.g., less than 100 microns in size) may achieve sufficient light intensity without consuming excessive power. For example, the shape, dimension, placement, and/or distribution of the nanostructures may be uniform across at least a portion of the light emitting diode. Alternatively, the shape, dimension, placement, and/or distribution of the nanostructures may vary across at least a portion of the entire light emitting diode 100 or across regions of the light emitting diode 100. For instance, a first region of the light emitting diode 100 (e.g., a first distance the sidewall of the light emitting diode 100) may be occupied by nanostructures having a first material composition, a first shape, a first dimension, a first placement, and/or a first distribution. Meanwhile, a second region of the light emitting diode (e.g., a second distance from the sidewall of the light emitting diode 100) may not include any nanostructures or may be occupied by nanostructures having a second material composition, a second shape, a second dimension, a second placement, and/or a second distribution.

At 804, the light emitting diode 100 may be formed by at least disposing, on a substrate layer, a buffer layer, one or more charge transport layers, and a light emission layer. For example, as shown in FIGS. 1A-B, the light emitting diode 100 may include the charge transport layer 112 disposed on top of the light emission layer 114. Furthermore, the charge transport layer 112 and the light emission layer 114 may be disposed on top of a substrate 120, with a buffer layer 116 and another charge transport layer 118 interposed therebetween.

At 806, a portion of the charge transport layer and/or the light emission layer may be removed such that a remaining portion of the charge transport layer and/or the light emission layer may include one or more protrusions and/or recesses. At 808, one or more plasmonic metamaterial nanostructures may be formed in the light emitting diode 100 by at least depositing a plasmonic metamaterial layer on the remaining portion of the charge transport layer and/or the light emission layer to form. For example, a portion of the charge transport layer 112 and/or the light emission layer 114 may be removed such that the remaining portion of the charge transport layer 112 and/or the light emission layer 114 form one or more protrusions and recesses (e.g., channels, indentations, and/or the like). The plasmonic metamaterial 110 may be deposited on the remaining portion of the charge transport layer 112 and/or the light emission layer 114 to form the one or more nanostructures.

In the example of the light emitting diode 100 shown in FIG. 1A, a portion of the charge transport layer 112 may be removed such that the remaining portion of the charge transport layer 112 include one or more protrusions and recesses. The plasmonic metamaterial 110 may be deposited inside the recesses formed in the charge transport layer 112 to form one or more nanostructures that are proximate to the light emission layer 114. Alternatively, FIG. 1B shows another example of the light emission diode 100 in which a portion of the charge transport layer 112 and the light emission layer 114 are removed to form one or more protrusions and recesses in the remaining portion of the charge transport layer 112 and the light emission layer 114.

The plasmonic metamaterial 110 may be disposed inside the recesses to form the one or more nanostructures. FIGS. 1C-D depicts additional examples of the light emitting diode 100 in which the plasmonic metamaterial 110 is embedded in the charge transport layer 112 and/or the light emission layer 114 to form the one or more nanostructures.

Figure 8B:
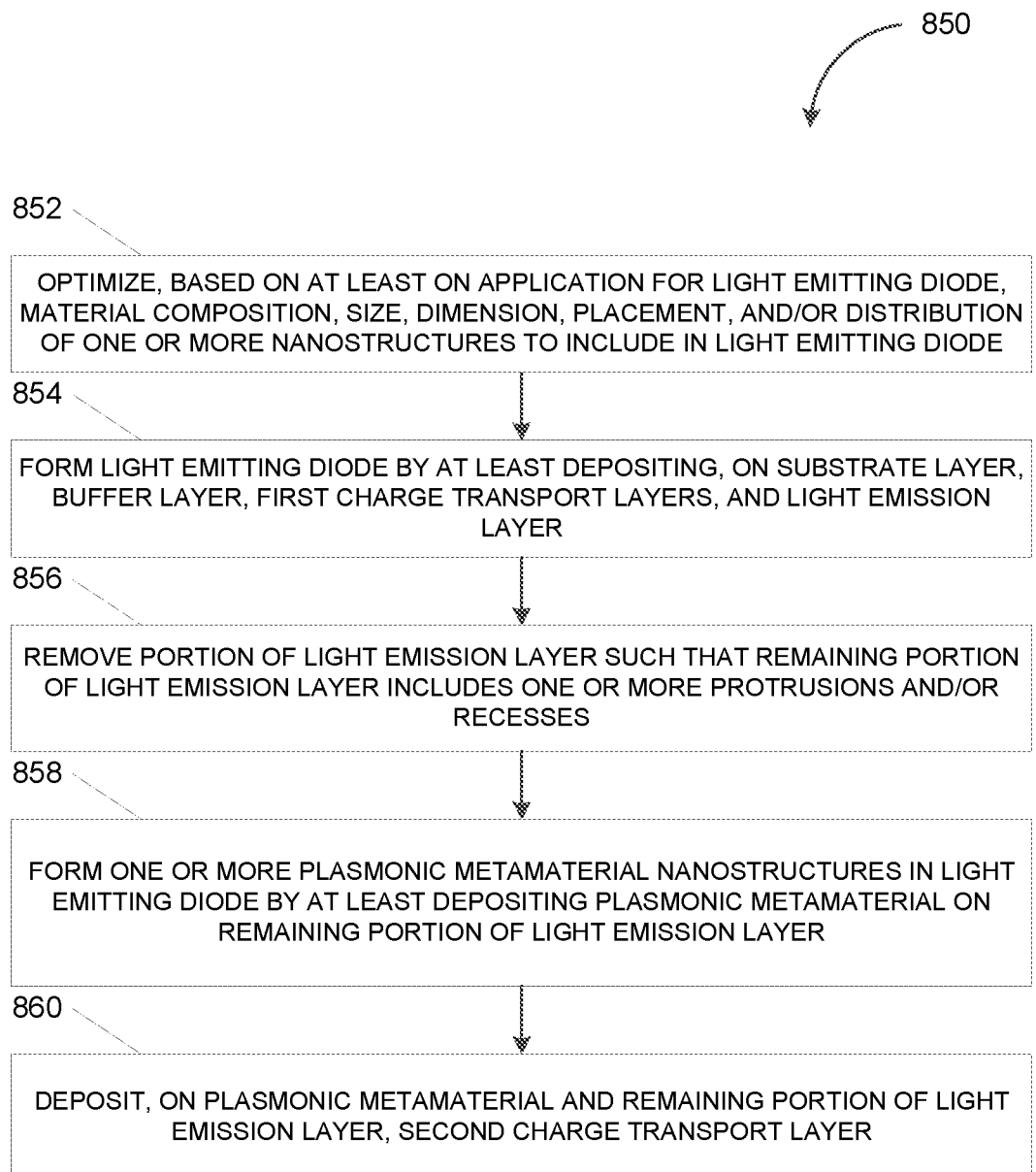
FIG. 8B depicts a flowchart illustrating another example of a process for fabricating an light emitting diode, in accordance with some example embodiments.

FIG. 8B depicts a flowchart illustrating another example of a process 850 for fabricating a light emitting diode, in accordance with some example embodiments. In some example embodiments, the process 850 may be performed to form examples of the light emitting diode 100 in which the one or more plasmonic metamaterial nanostructures are embedded in the charge transport layer and/or the light emission layer.

At 852, the material composition, size, dimension, placement, and/or distribution of one or more nanostructures to include in the light emitting diode 100 may be optimized based at least on an application for the light emitting diode 100. In some example embodiments, the shape, dimension, placement, and distribution of the nanostructures may be configured to maximize the quantum efficiency of the light emitting diode 100 such that the light emitting diode 100, even at a microscale (e.g., less than 100 microns in size) may achieve sufficient light intensity without consuming excessive power. For example, the shape, dimension, placement, and/or distribution of the nanostructures may be uniform across at least a portion of the light emitting diode. Alternatively, the shape, dimension, placement, and/or distribution of the nanostructures may vary across at least a portion of the entire light emitting diode 100 or across regions of the light emitting diode 100.

At 854, the light emitting diode 100 may be formed by at least disposing, on a substrate layer, a buffer layer, a first charge transport layer, and a light emission layer. For example, as shown in FIGS. 1A-B, the charge transport layer 118 as well as, optionally, the buffer layer 116, may be disposed on top of the substrate 120. The light emission layer 114 may be disposed on top the buffer layer 116 (if present) and/or the charge transport layer 118.

At 856, a portion of the light emission layer may be removed such that a remaining portion of the light emission layer may include one or more protrusions and/or recesses. At 858, one or more plasmonic metamaterial nanostructures may be formed in the light emitting diode 100 by at least depositing a plasmonic metamaterial on the remaining portion of the light emission layer. At 860, a second charge transport layer may be deposited on top of the plasmonic metamaterial and/or the remaining portion of the light emission layer. For example, a portion of the light emission layer 114 may be removed such that the remaining portion of the light emission layer 114 forms one or more protrusions and recesses (e.g., channels, indentations, and/or the like). The plasmonic metamaterial 110 may be deposited inside the recesses to form the one or more nanostructures before the charge transport layer 112 is deposited on top. For example, as shown in FIGS. 1C-D, the resulting light emitting diode 100 may include one or more nanostructures formed from the plasmonic metamaterial 110 embedded in the charge transport layer 112 and/or the light emission layer 114.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A light emitting diode, comprising:
   a light emission layer configured to emit light;
   a first charge transport layer disposed on the light emission layer; and
   one or more nanostructures formed by at least removing a portion of the first charge transport layer and depositing a plasmonic metamaterial on a remaining portion of the first charge transport layer, the one or more nanostructures comprising one or more protrusions and recesses formed by the remaining portion of the first charge transport layer, the one or more nanostructures including the plasmonic metamaterial deposited on the remaining portion of the first charge transport layer, and wherein the one or more nanostructures include a first type of nanostructures that are less than a threshold distance away from a sidewall of the light emitting diode, the threshold distance configured to minimize quenching of light emitted by the light emission layer, wherein the one or more nanostructures further include a type of nanostructures that are more than a diffusion length away from the sidewall of the light emitting diode, wherein the type of nanostructures that are more than the diffusion length away from the sidewall of the light emitting diode is of a different type than the first type of nanostructure.

2. The light emitting diode of claim 1, wherein a material composition, a shape, a dimension, a placement, and/or a distribution of the one or more nanostructures are configured to optimize a quantum efficiency of the light emitting diode.

3. The light emitting diode of claim 2, wherein the material composition, the shape, the dimension, the placement, and/or the distribution of the one or more nanostructures that optimizes the quantum efficiency of the light emitting diode is determined by at least applying one or more numerical methods including a Monte Carlo simulation and/or a finite-different time-domain (FDTD) method.

4. The light emitting diode of claim 2, wherein the material composition, the shape, the dimension, the placement, and/or the distribution of the one or more nanostructures that optimizes the quantum efficiency of the light emitting diode is determined based at least on one or more optical measurements including at least one photoluminescence measurement.

5. The light emitting diode of claim 1, wherein the first type of nanostructures are optimized by determining a first material composition, a first shape, a first dimension, a first placement, and/or a first distribution of the first type of nanostructures to maximize a quantum efficiency at the sidewall of the light emitting diode.

6. The light emitting diode of claim 1, wherein the one or more nanostructures further includes a second type of nanostructures that are a diffusion length away from the sidewall of the light emitting diode, and wherein the diffusion length corresponds to an average distance traveled by a carrier in a semiconductor material forming the light emitting diode between a generation of the carrier and a recombination of the carrier.

7. The light emitting diode of claim 6, wherein the second type of nanostructures are optimized by determining a second material composition, a second shape, a second dimension, a second placement, and/or a second distribution of the second type of nanostructures to maximize an emission of a carrier energy as visible light before the carrier energy is quenched by the sidewall of the light emitting diode.

8. The light emitting diode of claim 6, wherein the type of nanostructures that are more than the diffusion length away from the sidewall of the light emitting diode comprise a third type of nanostructures, wherein the third type of nanostructures are optimized by determining a third material composition, a third shape, a third dimension, a third placement, and/or a third distribution of the third type of nanostructures to maximize a quantum efficiency of the third type of nanostructures.

9. The light emitting diode of claim 8, wherein the first type of nanostructures are optimized prior to the second type of nanostructures and/or the third type of nanostructures.

10. The light emitting diode of claim 8, wherein the first type of nanostructures are optimized but not the second type of nanostructures and/or the third type of nanostructures.

11. The light emitting diode of claim 1, wherein the light emitting diode is less than 100 microns in size.

12. The light emitting diode of claim 1, wherein the light emitting diode is between 0.1 microns and 10 microns in size.

13. The light emitting diode of claim 1, wherein the one or more nanostructures are further formed by removing a portion of the light emission layer and depositing the plasmonic metamaterial inside the recesses formed in the remaining portion of the light emission layer.

14. The light emitting diode of claim 13, wherein the one or more nanostructures are further formed by depositing at least a portion of the first charge transport layer on top of the plasmonic metamaterial and the remaining portion of the light emission layer.

15. The light emitting diode of claim 1, wherein the one or more protrusions and recesses form one or more channels and/or indentations in the first charge transport layer and/or the light emission layer.

16. The light emitting diode of claim 1, wherein the light emitting diode further comprises a second charge transport layer, a buffer layer, and a substrate, wherein the second charge transport layer is disposed on the substrate, and wherein the buffer layer is interposed between the light emission layer and the second charge transport layer.

17. The light emitting diode of any of claim 16, further comprising an isolation layer forming an interface between at least a portion of the plasmonic metamaterial, the first charge transport layer, the light emission layer, and/or the second charge transport layer.

18. The light emitting diode of claim 1, further comprising one or more contacts and bonding pads.

19. A light emitting diode, comprising:
a light emission layer;
a first charge transport layer disposed on the light emission layer; and
one or more nanostructures formed by at least removing a portion of the first charge transport layer and depositing a plasmonic metamaterial on a remaining portion of the first charge transport layer, the one or more nanostructures comprising one or more protrusions and recesses formed by the remaining portion of the first charge transport layer, the one or more nanostructures including the plasmonic metamaterial deposited on the remaining portion of the first charge transport layer, and
wherein the one or more nanostructures include a first type of nanostructures that are less than a threshold distance away from a sidewall of the light emitting diode, the threshold distance configured to minimize quenching of light emitted by the light emission layer,
wherein the one or more nanostructures further include a type of nanostructures that are more than a diffusion length away from the sidewall of the light emitting diode, wherein the type of nanostructures that are more than the diffusion length away from the sidewall of the light emitting diode is of a different type than the first type of nanostructure, and
wherein the light emitting diode is between 0.1 microns and 10 microns in size.

* * * * *